US012705227B2

(12) United States Patent
Bailey et al.

(10) Patent No.: US 12,705,227 B2
(45) Date of Patent: Aug. 11, 2026

(54) MAINTAINING DATASET INTEGRITY DURING INGESTION OF USER INTERFACE DATA

(71) Applicant: INTERNATIONAL BUSINESS MACHINES CORPORATION, Armonk, NY (US)

(72) Inventors: Logan Bailey, Atlanta, GA (US); Zachary A. Silverstein, Georgetown, TX (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/475,181

(22) Filed: Sep. 26, 2023

(65) Prior Publication Data

US 2025/0103582 A1 Mar. 27, 2025

(51) Int. Cl.
*G06F 17/00* (2019.01)
*G06F 7/00* (2006.01)
*G06F 9/451* (2018.01)
*G06F 16/23* (2019.01)

(52) U.S. Cl.
CPC .......... *G06F 16/2365* (2019.01); *G06F 9/451* (2018.02)

(58) Field of Classification Search
CPC ............................. G06F 16/2365; G06F 9/451
USPC ......................................................... 707/691
See application file for complete search history.

(56) References Cited

U.S. PATENT DOCUMENTS

| | | | | |
|---|---|---|---|---|
| 9,495,436 | B2 * | 11/2016 | Nivargi | H04L 67/10 |
| 12,050,598 | B2 * | 7/2024 | Obeidat | G06F 16/252 |
| 12,223,552 | B1 * | 2/2025 | Kottoor | G06F 16/24573 |
| 2004/0267813 | A1 * | 12/2004 | Rivers-Moore | G06F 40/143 |
| 2007/0130176 | A1 * | 6/2007 | Kawabe | G06F 40/186 715/255 |
| 2007/0294281 | A1 * | 12/2007 | Ward | G06Q 30/02 707/999.102 |
| 2009/0292994 | A1 * | 11/2009 | Lwo | G06F 16/1794 715/764 |
| 2010/0145902 | A1 * | 6/2010 | Boyan | G06F 16/958 715/810 |
| 2014/0059112 | A1 | 2/2014 | Chen | |
| 2014/0298361 | A1 * | 10/2014 | Cussonneau | H04N 21/25808 719/328 |
| 2015/0088557 | A1 | 3/2015 | Huynh | |
| 2017/0052652 | A1 * | 2/2017 | Denton | G06F 3/04847 |

(Continued)

FOREIGN PATENT DOCUMENTS

CN 110991411 A 4/2020

OTHER PUBLICATIONS

Anwar, A., et al., "Machine Learning to Ensure Data Integrity in Power System Topological Network Database", Electronics (2020), vol. 9:693, 17 pgs., downloaded from https://www.mdpi.com/2079-9292/9/4/693.

*Primary Examiner* — Pavan Mamillapalli
(74) *Attorney, Agent, or Firm* — CHIP LAW GROUP

(57) ABSTRACT

A computer-implemented method includes connecting to a dataset; ingesting data from a user interface (UI); and comparing ingested data in fields that have been entered to expected data. The expected data includes data in corresponding entries of the dataset, and backend document object model (DOM) values. The computer-implemented method further comprises identifying any inconsistencies between the ingested data and the expected data.

15 Claims, 4 Drawing Sheets

(56) References Cited

U.S. PATENT DOCUMENTS

| | | | | |
|---|---|---|---|---|
| 2020/0012553 | A1* | 1/2020 | Subhedar | G06F 12/0802 |
| 2020/0019418 | A1* | 1/2020 | P K | G06F 9/453 |
| 2020/0175028 | A1* | 6/2020 | Kozlowski | G06F 16/252 |
| 2021/0334656 | A1 | 10/2021 | Sjögren | |
| 2023/0083000 | A1* | 3/2023 | Fujimoto | G06V 30/26 382/159 |
| 2023/0359609 | A1* | 11/2023 | Kt | G06F 16/215 |
| 2023/0393832 | A1* | 12/2023 | Touati | H04L 67/10 |
| 2023/0393963 | A1* | 12/2023 | Mangat | G06F 11/3612 |
| 2024/0338248 | A1* | 10/2024 | Bose | G06F 9/451 |
| 2025/0232375 | A1* | 7/2025 | Tao | G06Q 40/06 |

* cited by examiner

FIG. 4

MAINTAINING DATASET INTEGRITY DURING INGESTION OF USER INTERFACE DATA

BACKGROUND

Technical Field

The present disclosure generally relates to data management, and more particularly, to software robots for maintaining accurate and up-to-date datasets.

Description of the Related Art

Data management may refer to the practice of ingesting, processing, securing and storing an organization's data. That data may be utilized for strategic decision-making.

Accuracy and integrity of organizational data is maintained in order to ensure effective decision making. In datasets where accurate current data may change regularly, finding and cleaning up errors can be both time-consuming and costly.

SUMMARY

According to an embodiment of the present disclosure, a computer-implemented method includes connecting to a dataset; ingesting data from a user interface (UI); and comparing ingested data in fields that have been entered to expected data. The expected data includes data in corresponding entries of the dataset, and backend document object model (DOM) values. The computer-implemented method further includes identifying any inconsistencies between the ingested data and the expected data.

In some embodiments, data from a UI is automatically and continuously checked for accuracy as it is ingested. In some embodiments, software robots are used to ingest the data from the UI. In some embodiments, the ingesting includes automating a set of tasks, and collecting data from the tasks as the tasks are performed or completed.

In some embodiments, a machine learning (ML) model is used to recognize patterns or anomalies in the dataset based on detected on screen data. In some embodiments, the ML model is used to identify relationships between the ingested data and the expected data.

In some embodiments, if an inconsistency is identified, remedial measures may be taken to maintain integrity of data in the dataset. In some embodiments, the remedial action includes flagging data in the dataset for which inconsistencies have been identified. In some embodiments, the remedial action includes replacing data in the dataset for which inconsistencies have been identified. In some embodiments, the remedial action includes arbitrating a conflict between more than one ingested value.

According to an embodiment of the present disclosure, a computer system includes a memory having computer readable instructions, and one or more processors for executing the computer readable instructions to configure the computer system to perform a method including connecting to a dataset, receiving ingested data from a UI, comparing ingested data in fields that have been entered to expected data, and identifying any inconsistencies between the ingested data and the expected data. The expected data includes data in corresponding entries of the dataset and backend DOM values.

In some embodiments, the computer system is cloud-based. In some embodiments, the method further includes performing optical character recognition of the UI and including recognized features from the optical character recognition as part of the expected data. In some embodiments, the method further includes performing a web scraping of the UI and including data collected from the web scraping as part of the expected data.

In some embodiments, the method further includes using a machine learning (ML) model to determine whether a relationship exists between the ingested data and the expected data. In some embodiments, the method further includes performing remedial action for any inconsistencies between the ingested data and the expected data.

According to an embodiment of the present disclosure, a computer program product includes one or more computer-readable memory devices encoded with data including instructions that, when executed, cause a processor set to maintain dataset integrity, including connecting to a dataset; ingesting data from a UI; and comparing ingested data in fields that have been entered to expected data. The expected data includes data in corresponding entries of the dataset, and backend DOM values. The computer-implemented method further includes identifying any inconsistencies between the ingested data and the expected dat.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 4 is an illustration of an end user device for the cloud-based system of FIG. 3, consistent with an illustrative embodiment,

DETAILED DESCRIPTION

Overview

Figure 1:
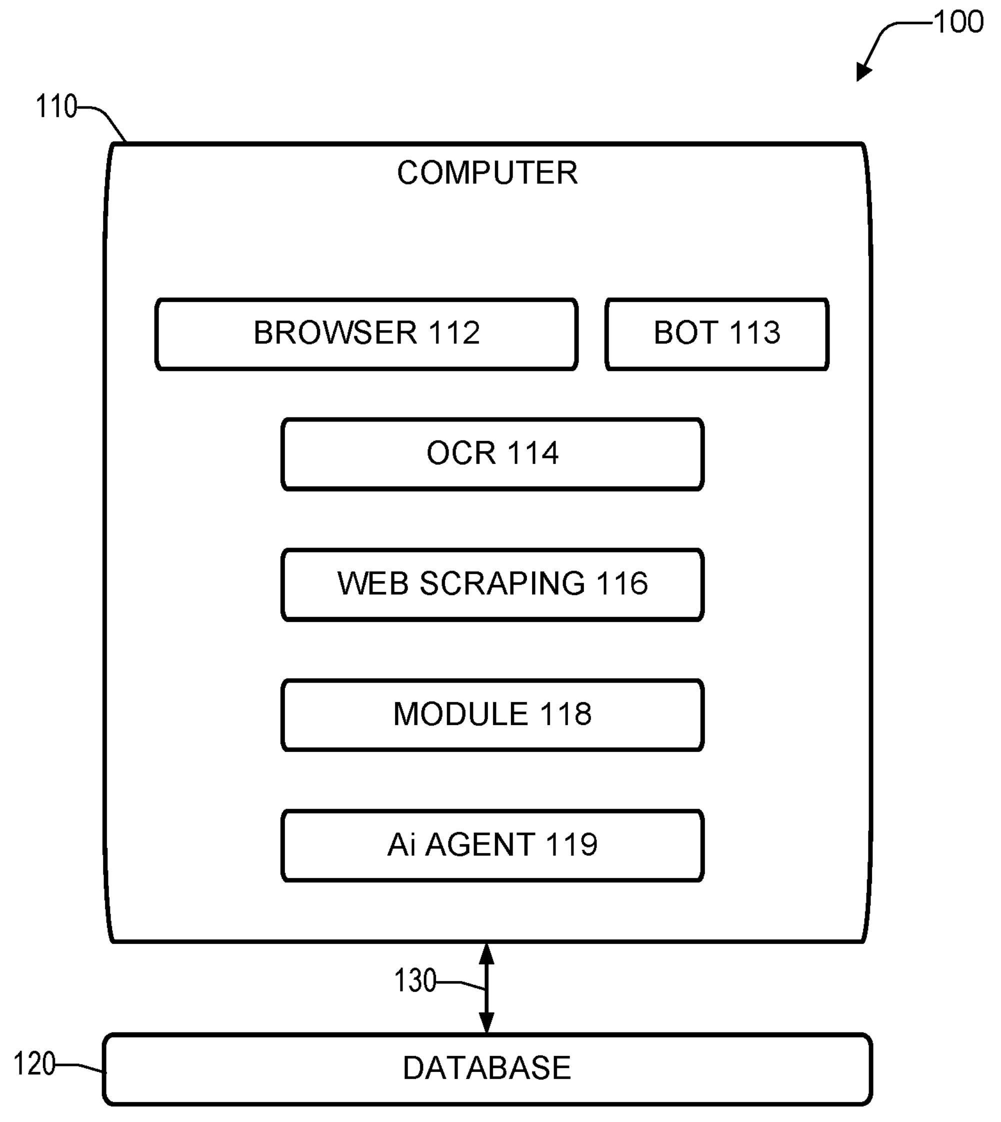
FIG. 1 is a computer system, consistent with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to data management. By virtue of the concepts discussed herein, inconsistencies in datasets are identified quickly with an efficient use of computer resources.

According to an embodiment of the present disclosure, a computer-implemented method includes connecting to a dataset, ingesting data from a UI, and comparing ingested data in fields that have been entered to expected data. The expected data includes data in corresponding entries of the dataset, and backend DOM values. The method further includes identifying any inconsistencies between the ingested data and the expected data.

The combination of the database entries and the backend DOM increases the accuracy of identifying inconsistencies. Identifying inconsistencies at data ingestion is faster and offers a far more efficient use of computational resources than searching a dataset for inconsistencies. Catching errors before they are entered in a dataset is faster and far more efficient than correcting errors after they have been entered in the dataset.

In some embodiments, data from a UI is automatically and continuously checked for accuracy as it is ingested. In some embodiments, software robots are used to ingest the data from the UI. In some embodiments, the ingesting includes automating a set of tasks, and collecting data from the tasks as the tasks are performed or completed.

The accuracy of identifying the inconsistencies can be further improved by one or both of the following: optical character recognition, and web scraping. In some embodiments, optical character recognition of the UI is performed, and recognized features from the optical character recognition are used as part of the expected data. In some embodiments, web scraping of the UI is performed, and data collected from the web scraping is used as part of the expected data. In some embodiments, both OCR and web scraping are be performed.

In some embodiments, a machine learning (ML) model is used to recognize patterns or anomalies in the dataset based on detected on screen data. In some embodiments, the ML model may be used to identify relationships between the ingested data and the expected data. The machine learning model will have already been trained on keywords and/or primary keys of the dataset.

In some embodiments, if an inconsistency is identified, remedial measures may be taken to maintain integrity of data in the dataset. In some embodiments, the remedial action includes flagging data in the dataset for which inconsistencies have been identified. In some embodiments, the remedial action includes replacing data in the dataset for which inconsistencies have been identified. In some embodiments, the remedial action includes arbitrating a conflict between more than one ingested value. Different combinations of these remedial actions may be performed.

Taking the remedial measures at data ingestion is a much more efficient use of computer resources, as it reduces the amount of time and resources spent on manual data entry and cleaning. It is especially valuable for datasets where accurate current data may change frequently.

In some embodiments, a web browser is used to provide the UI and ingest the data. The web browser provides redundancy for data checking.

According to an embodiment of the present disclosure, a computer system includes a memory having computer readable instructions, and one or more processors for executing the computer readable instructions to configure the computer system to perform a method including connecting to a dataset, receiving ingested data from a user interface (UI), comparing ingested data in fields that have been entered to expected data, and identifying any inconsistencies between the ingested data and the expected data. The expected data includes data in corresponding entries of the dataset and backend document object model (DOM) values.

In some embodiments, the computer system is cloud-based. The computer system receives ingested data from the UI of an end user device.

In some embodiments of the computer system, the method further includes performing optical character recognition of the UI and including recognized features from the optical character recognition as part of the expected data. In some embodiments of the computer system, the method further includes performing a web scraping of the UI and including data collected from the web scraping as part of the expected data. Accuracy of identifying any inconsistencies is further improved by adding OCR data, or web scraping data, or both to the expected data.

In some embodiments of the computer system, the method further incudes using a machine learning (ML) model to determine whether a relationship exists between the ingested data and the expected data. Accuracy of identifying any inconsistencies is further improved.

In some embodiments of the computer system, the method further includes performing remedial action for any inconsistencies between the ingested data and the expected data. Taking the remedial measures at data ingestion is a much more efficient use of computer resources, as it reduces the amount of time and resources spent on manual data entry and cleaning. It is especially valuable for datasets where accurate current data may change frequently.

According to an embodiment of the present disclosure, a computer program product includes one or more computer-readable memory devices encoded with data including instructions that, when executed, cause a processor set to maintain dataset integrity. A connection is made to the dataset, ingested data from a UI is received, the ingested data is compared to expected data, and any inconsistencies between the ingested data and the expected data are identified. The expected data includes data in corresponding entries of the dataset and backend DOM values.

Example Construction

Reference is made to FIG. 1, which illustrates a computer system 100 including a computer 110 and a dataset. A dataset broadly refers to a corpus of data. Examples of a dataset include, but are not limited to, a database, a dataschema, and a model. In the example of FIG. 1, the dataset includes a database 120. A database 120 that is small may be stored on a file system, while a database 120 that is large may be hosted on computer clusters or cloud storage. The database 120 may be controlled by a database management system (DBMS).

The computer 110 is configured with a user interface. A user interface generally refers to the space in which a user and a computer system interact, in particular through the use of input devices and software. In the example of FIG. 1, the UI is provided in part by an application such as a web browser 112.

The computer 110 may be configured to perform a variety of tasks. As used herein, a task generally refers to a unit of execution or work within a job such as a process. Categories of tasks include, but are not limited to, defining inputs and outputs, working with assets, and clicking and following processes.

In the computer 110 of FIG. 1, a sequence of tasks may be automated by a software robot or "bot" 113. A bot generally refers to a software tool that carries out automated, repetitive, pre-defined tasks. In the computer of FIG. 1, the bot 113 may be configured for, without limitation, robotic process automation (RPA), UI Automation or task mining. In addition to automating a series of tasks, the bot 113 may also be configured to collect data from the tasks.

RPA refers to automation technologies that mimic back-office tasks of human workers, such as extracting data, filling in forms, and moving files. It combines application programming interfaces (APIs) and UI interactions to integrate and automate repetitive tasks. Scripts may be deployed to automate the tasks.

RPA can be assisted by an artificial intelligence (AI) agent. The AI agent implements a machine learning (ML) model that can help RPA automate tasks more fully and handle more complex use cases. RPA also enables AI insights to be actioned on more quickly instead of waiting on manual implementations.

UI Automation refers to a framework that enables applications to provide and ingest information about elements of a UI. The UI elements are contained in a tree structure. UI Automation clients can register for specific event notifications and can request that specific UI Automation properties and control pattern information be passed into their event handlers. UI Automation may also provide tools for automating tasks.

A task mining agent refers to a tool that records actions and collects user interaction data such as keystrokes, mouse, clicks and data entries. Recorded data can be sent to a task mining backend for analysis of each step that is captured.

The bot 113 may be embedded in the web browser 112 through a browser extension. The browser extension may utilize Javascript or other means to perform the functions described herein.

The computer 110 may also store an application 114 that performs optical character recognition, and/or an application 116 that performs web scraping. Web scraping refers to fetching web pages from web sites and extracting information from the web pages. These applications 114 and 116 may be standalone applications or they may be embedded in the browser 112 via extensions.

Figure 2:
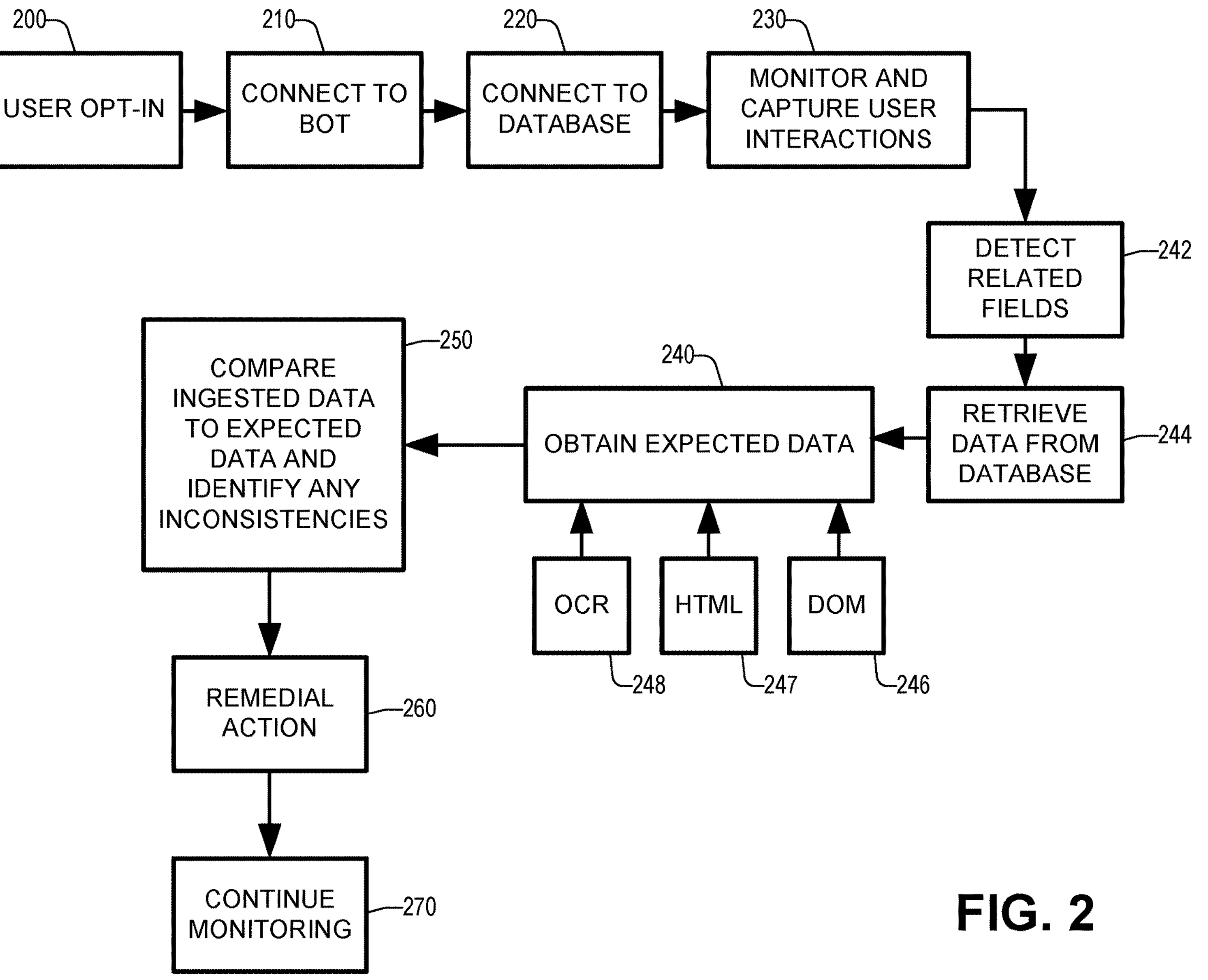
FIG. 2 is a computer-implemented method, consistent with an illustrative embodiment.

The computer 110 also has access to an application referred to as a module 118 that, when executed, is configured to communicate with the database 120, the web browser 112 and bot 113, the OCR application 114 and the web scraping application 116. The module 118 may be a standalone application, or it too may be integrated with the web browser 112. FIG. 2 describes the module 118 in terms of functionality.

The computer 110 may connect with the database 120 for bidirectional communication. A connection 130 is represented in FIG. 1 by a double arrow.

The computer 110 may also store an AI agent 119 that is configured to assist the bot 113. The AI agent 119 may help RPA automate tasks more fully. The AI agent 119 may also assist the module 118.

Additional reference is made to FIG. 2, which illustrates a computer-implemented method that is performed by the module 118. At block 200, the module gives a user a choice of opting in. By opting in, the user permits the computer 110 to monitor tasks.

At block 210, the module 118 connects to the bot 113. This enables the bot 113 to automate tasks and collect data from those tasks.

At block 220, the module 118 makes a connection 130 to the database 120. The connection 130 may be direct or indirect. As an example of a direct connection, the browser 112 communicates with the DBMS. As an example of an indirect connection, the browser 112 is used to log onto a website, and the website accesses information from the database, and sends the information to the browser 112. The website also receives information from the browser 112 and stores the information in the database 120.

At block 230, the module 118 monitors and captures user interactions to automated tasks. As data is entered into UI elements, the module 118 collects the data.

At block 240, the module 118 obtains expected data for the UI elements. The expected data is obtained from one or more of the following sources. The module 118 may utilize machine learning or logical rules to detect related fields (block 242), and retrieve data from the database 120 (block 244).

The module may also obtain data backend document object model (DOM) values (block 246). DOM refers to a cross-platform and language-independent interface that treats an HTML or XML document as a tree structure, where each node is an object that represents a part of the document. The DOM represents a document with a logical tree. Consider an HTML file. A browser downloads the HTML file into local memory and automatically parses it to display a page on screen.

Each element node has a tag name and attributes. The module 118 can collect data from the tag names and attributes.

The module 118 may request the web scraping application 116 to perform web scraping of the UI elements and add data from the web scraping to expected data (block 247).

The module 118 may request the OCR application 114 to perform optical character recognition to recognize objects on the UI. The recognized objects are added to the expected data (block 248).

At block 250, the module 118 compares the ingested data in fields that have been entered to the expected data and identifies any inconsistencies between the ingested and expected data. The module 118 may check for correlation to the expected data contained by means such as data similarity and parallel open dataset instance.

The module 118 may also request the AI agent 119 to use its ML model, which has been trained to recognize patterns or inconsistencies. The ML model is not limited to any particular theory. Without limitation, different ML theories include regression, queuing theory, correlation, statistical modeling, and neural networks. These models may be trained on keywords. A training set may include expected data (database, DOM, OCR and web scraping values) as inputs and the correct data entry as an output.

A neural network may be trained for natural language processing (NLP). A large pre-trained NLP model could be fine-tuned by adjusting weights of the entire neural network or just a subset of layers.

As an alternative to an ML model, the module 118 may apply a set of logical rules to the ingested data. The module may evaluate the information by checking alternative keys for proper binding. The keys may be used to determine a set of rules (e.g., a list of States) and the rules determine whether a data value in a UI field is correct. For example, if the set of rules includes a list of States, then the data value must be one of the States in the list.

At a minimum, the expected data includes DOM values and database values. Ensuring that these values match the ingested data as an expected relationship is advantageous. For example, if "FL" is entered into a UI field, the backend should indicate "Florida." If the bot 113 intends to select a value called FL, then there must be a match between the intention of the bot 113, the data entered in the UI, and what the backend system shows. The match doesn't have to be exact, but a relationship must exist. The AI agent 119 may be used to determine whether a relationship exists.

The DBMS provides another source of validation. For instance, if the input source is a website and the output source is the DBMS, then there is some amount of processing in between.

At block 260, the module 118 may perform remedial action to address any inconsistencies. As a first example, the remedial action includes flagging data in the dataset for which inconsistencies have been identified. A flagged error may be seen as a mismatch between the expected data and the ingested data.

As a second example, the remedial action includes replacing data in the dataset for which inconsistencies have been identified. The replacement value may be the value of the ingested data. In the alternative, the DBMS may correct the flagged error.

In some instances, multiple users might attempt to simultaneously access a data field in a database (such a situation would not be unusual for a large database with a large number of users and data that changes frequently). Multiple values of ingested data might be inconsistent with the expected values. As a third example, the remedial action further includes arbitrating a conflict between the multiple data values. The arbitration might be performed, for instance, by accepting the first value to arrive.

In certain situations, no remedial action is taken. For example, an inconsistent ingested value is deemed wrong if the database 120 is marked as the proper system or source of truth. A user can then be prompted to enter a correct value.

At block 270, the module 118 continues to monitor and collect data from the UI. Control is returned to block 230.

FIG. 1 illustrates a single computer connected to a database. The method performed by that single computer improves computational efficiency for data entry. However, a large database may be accessed by thousands of computers, and data may be changed frequently. With each of those computers performing the method of FIG. 2, the improvement in computational efficiency is significant. Despite the amount of volume through system, multiple modules 118 may collectively identify and address inconsistencies quickly and efficiently. Catching errors before they are entered in the database is faster and far more efficient than correcting errors after they have been entered in the database.

FIG. 1 illustrates a computer system 100 in which the module 118 is local to the computer 110. However, a system herein is not so limited. As a first example, a system herein may be cloud-based. Functions by the module 118, OCR and web scraping applications 114 and 116, and AI agent 119 are performed in the cloud on the server side, and an end user device on the client side has a web browser 112 and bot 113 configured to send UI data to the server side. As a second example, the system is a hybrid, where some functions are performed in the cloud (functions performed by the module 118 and the AI agent 119) while other functions are performed locally (functions performed by the web browser 112, the bot 113, the OCR application 114 and the web scraping application 116).

Example Particularly Configured Cloud Computing

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 3:
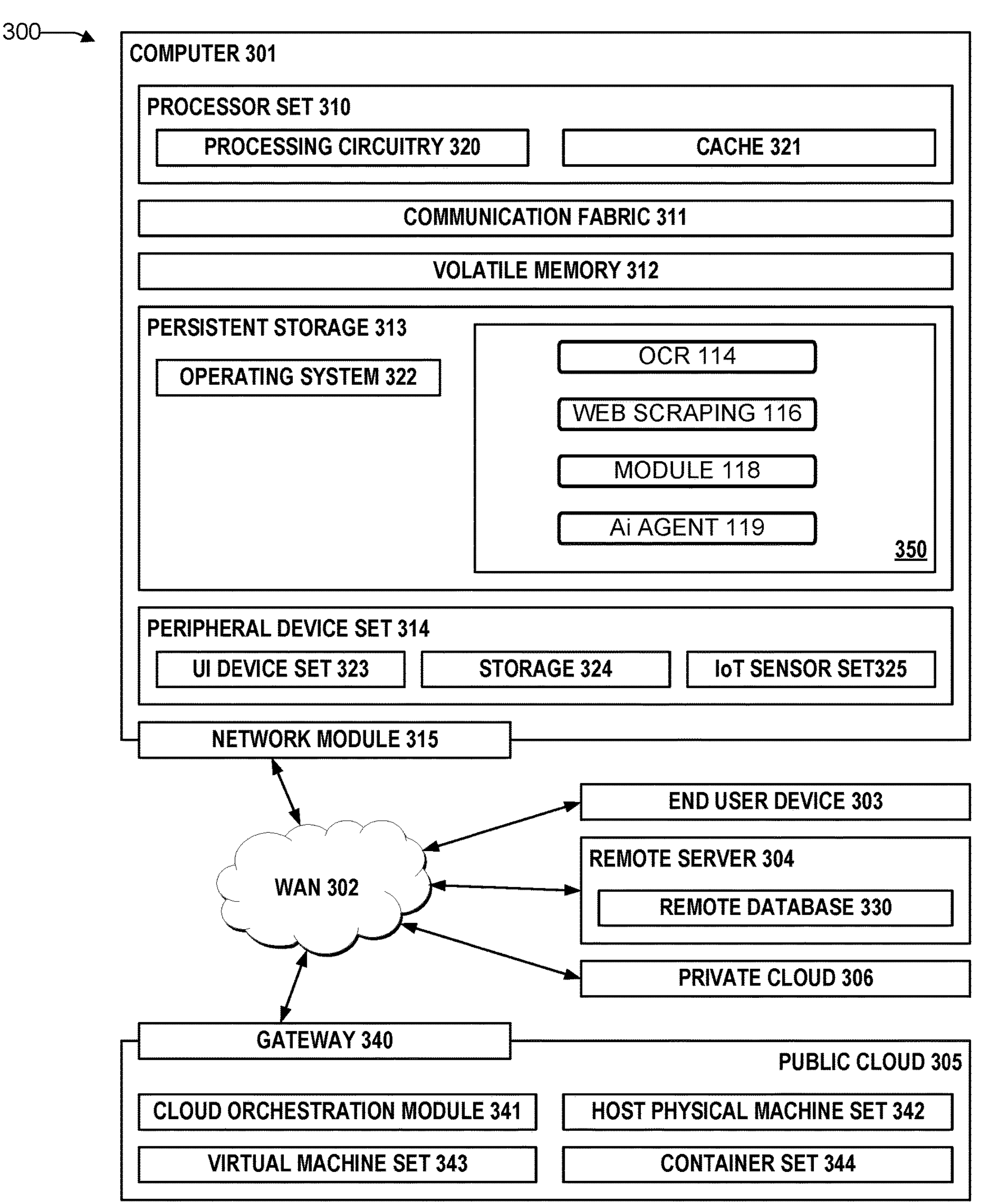
FIG. 3 is a cloud-based system consistent with an illustrative embodiment.

Referring to FIG. 3, computing environment 300 includes an example of an environment for the execution of at least some of the computer code involved in performing the inventive methods, including block 350, which includes one or more of blocks 114-119 of FIG. 1. The computing environment 300 includes, for example, computer 301, wide area network (WAN) 302, end user device (EUD) 303, remote server 304, public cloud 305, and private cloud 306. In this embodiment, the computer 301 includes processor set 310, communication fabric 311, volatile memory 312, persistent storage 313 (including operating system 322 and block 350, as identified above), peripheral device set 314 (including user interface (UI) device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

COMPUTER 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

PROCESSOR SET 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located “off chip.” In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as “the inventive methods”). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in block 350 in persistent storage 313.

COMMUNICATION FABRIC 311 is the signal conduction path that allows the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 312 is any type of volatile memory now known or to be developed in the future. Examples include dynamic type random access memory (RAM) or static type RAM. Typically, volatile memory 312 is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

PERSISTENT STORAGE 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface-type operating systems that employ a kernel.

The code included in block 350 typically includes at least some of the computer code involved in performing the inventive methods. The block 350 of FIG. 3 includes the module 118 and the AI agent 119. Thus, the computer 301 is enabled to connect to the remote database 330 via the remote server 304, receive ingested data from the UI of an end user device 303, compare that ingested data to expected data, and identify any inconsistencies between the ingested data and the expected data. The block 350 may also contain OCR and web scraping applications 114 and 116 to enable additional expected data to be obtained. The computer 301 may also communicate with the remote server 304 to perform remedial action in the remote database 330 if any inconsistencies are identified.

PERIPHERAL DEVICE SET 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

NETWORK MODULE 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN 302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

REMOTE SERVER 304 is any computer system that serves at least some data and/or functionality to computer 301. In some embodiments, remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

PUBLIC CLOUD 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 136 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

Figure 4:
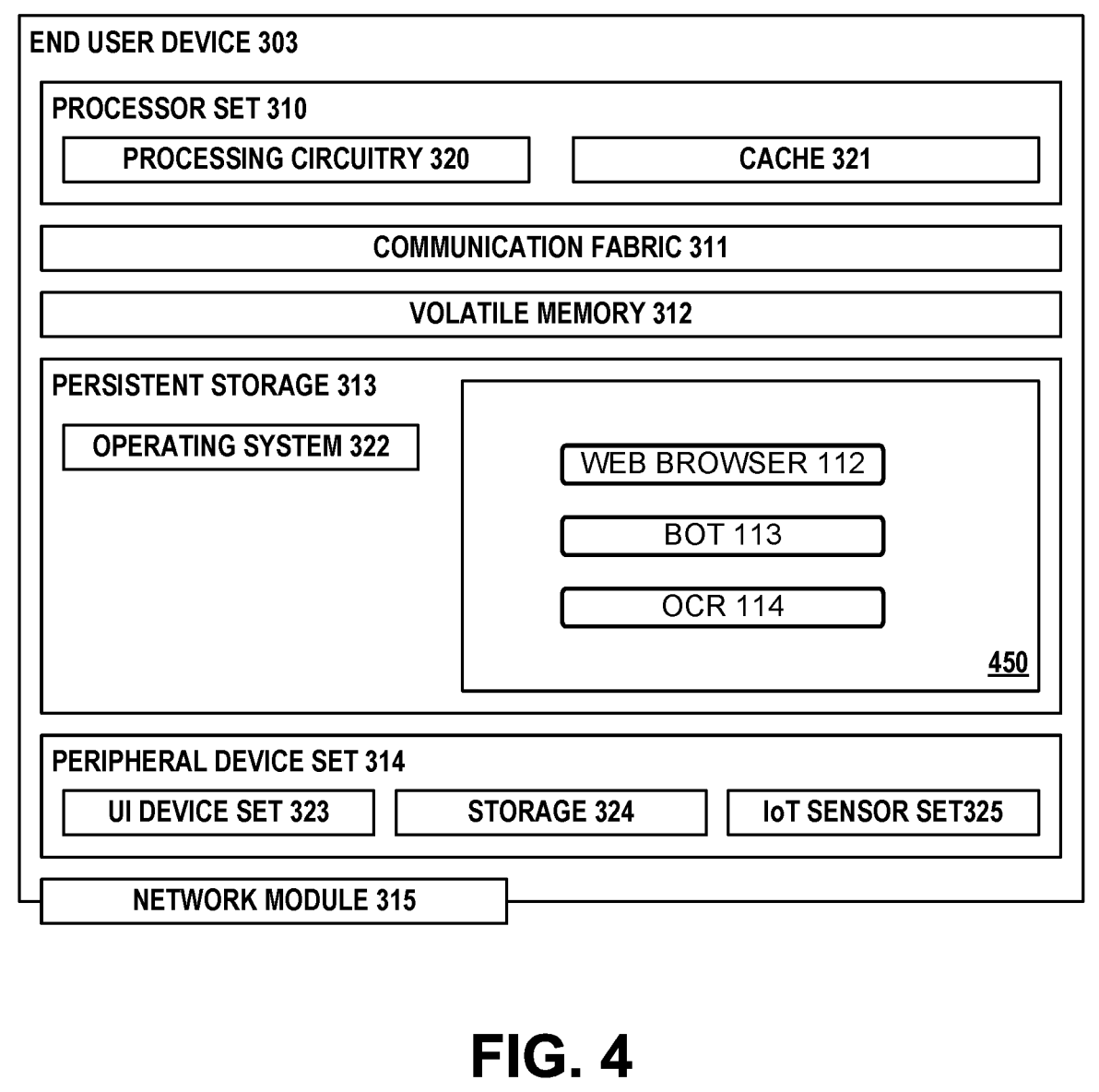

Reference is now made to FIG. 4, which illustrates certain features of the EUD 303 . . . . The EUD 303 includes at least some of the same components as the computer 301. For instance, the EUD 303 includes a processor set 310, communication fabric 311, volatile memory 312, persistent storage 313, a peripheral device set 314, and a network module 315.

The persistent storage includes block 450, which enables the EUD 303 to ingest UI data and send the ingested data to the computer 301. Code in block 450 includes a web browser 112 and a bot 113 for ingesting browser-entered data and sending the ingested UI data to the computer 301. Code in block 450 may further include an OCR application 114 for recognizing features of images displayed by the browser. The bot 113 may be configured to send the recognized features to the computer 301 along with the ingested UI data.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method, comprising:
- connecting an application associated with a user interface (UI) to a dataset and a software robot;
- ingesting, by the software robot, data from one or more fields of the UI, wherein the ingesting includes:
  - monitoring user interactions of entering the data into the one or more fields of the UI; and
  - collecting the data entered into the one or more fields of the UI;
- obtaining expected data for the one or more fields of the UI, wherein the obtaining of the expected data includes:
  - executing a web scrapping process for the one or more fields of the UI to obtain first data;
  - adding the first data to the expected data; and
  - obtaining second data from data backend document object model (DOM) values, wherein the expected data includes data in corresponding entries of the dataset, the first data, and the second data;
- comparing, by the application, the ingested data with the expected data based on a data similarity technique;
- identifying, by the application, one or more inconsistencies between the ingested data and the expected data based on the comparing, wherein
  - the one or more inconsistencies comprise a lack of correlation between the expected data and the ingested data, and
  - the identifying of the one or more inconsistencies is performed prior to entering the ingested data into the dataset; and
- performing, by the application, one or more remedial actions on at least one of the ingested data or the dataset, based on the identifying of the one or more inconsistencies.

2. The computer-implemented method of claim 1, wherein the data from the one or more fields of the UI is automatically and continuously checked for accuracy during the ingesting of the data.

3. The computer-implemented method of claim 1, wherein the ingesting further includes automating a set of tasks, and collecting data from the set of tasks as the set of tasks is performed or completed.

4. The computer-implemented method of claim 1, further comprising:
- performing optical character recognition of the UI; and
- adding one or more features, recognized from the optical character recognition, to the expected data.

5. The computer-implemented method of claim 1, further comprising:
- detecting on screen data; and
- recognizing patterns or anomalies in the dataset using a machine learning (ML) model trained on keywords and primary keys of the dataset, wherein the recognizing is based on the detected on screen data.

6. The computer-implemented method of claim 1, further comprising determining, using a machine learning (ML) model, whether a relationship exists between the ingested data and the expected data for the identifying of the one or more inconsistencies.

7. The computer-implemented method of claim 1, wherein the one or more remedial actions include flagging the data in the dataset based on the identifying of the one or more inconsistencies.

8. The computer-implemented method of claim 1, wherein the one or more remedial actions include replacing a corresponding value in the dataset with an ingested data value of the ingested data, and the replacing is based on the identifying of the one or more inconsistencies between the corresponding value and the ingested data value.

9. The computer-implemented method of claim 1, wherein the one or more remedial actions include arbitrating a conflict between two or more ingested values of the ingested data.

10. The computer-implemented method of claim 1, wherein the UI is associated with a web browser, and the web browser is used for the ingesting of the data.

11. A computer system comprising a memory having computer readable instructions, and one or more processors for executing the computer readable instructions to configure the computer system to perform operations, the operations comprising:

connecting an application associated with a user interface (UI) to a dataset and a software robot;

ingesting, by the software robot, data from one or more fields of the UI, wherein the ingesting includes:

monitoring user interactions of entering the data into the one or more fields of the UI; and collecting the data entered into the one or more fields of the UI;

obtaining expected data for the one or more fields of the UI, wherein the obtaining of the expected data includes:

executing a web scrapping process for the one or more fields of the UI to obtain first data;

adding the first data to the expected data; and obtaining second data from data backend document object model (DOM) values, wherein the expected data includes data in corresponding entries of the dataset, the first data, and the second data;

comparing, by the application, the ingested data with the expected data based on a data similarity technique;

identifying, by the application, one or more inconsistencies between the ingested data and the expected data based on the comparing, wherein the one or more inconsistencies comprise a lack of correlation between the expected data and the ingested data, and the identifying of the one or more inconsistencies is performed prior to entering the ingested data into the dataset; and performing, by the application, one or more remedial actions on at least one of the ingested data or the dataset, based on the identifying of the one or more inconsistencies.

12. The computer system of claim 11, wherein the computer system is a cloud-based system, and the ingested data is received from the UI of an end user device.

13. The computer system of claim 12, wherein the operations further comprise:

performing optical character recognition of the UI; and adding one or more features, recognized from the optical character recognition, to the expected data.

14. The computer system of claim 12, wherein the operations further comprise determining, using a machine learning (ML) model, whether a relationship exists between the ingested data and the expected data for the identifying of the one or more inconsistencies.

15. A computer program product comprising one or more computer-readable memory devices encoded with data including instructions that, when executed, causes a processor set to execute operations for maintaining dataset integrity, the operations comprising:

connecting an application associated with a user interface (UI) to a dataset and a software robot;

ingesting, by the software robot, data from one or more fields of the UI, wherein the ingesting includes:

monitoring user interactions of entering the data into the one or more fields of the UI; and collecting the data entered into the one or more fields of the UI;

obtaining expected data for the one or more fields of the UI, wherein the obtaining of the expected data includes:

executing a web scrapping process for the one or more fields of the UI to obtain first data;

adding the first data to the expected data; and obtaining second data from data backend document object model (DOM) values, wherein the expected data includes data in corresponding entries of the dataset, the first data, and the second data;

comparing, by the application, the ingested data with the expected data based on a data similarity technique;

identifying, by the application, one or more inconsistencies between the ingested data and the expected data based on the comparing, wherein the one or more inconsistencies comprise a lack of correlation between the expected data and the ingested data, and the identifying of the one or more inconsistencies is performed prior to entering the ingested data into the dataset; and performing, by the application, one or more remedial actions on at least one of the ingested data or the dataset, based on the identifying of the one or more inconsistencies.

* * * * *